United States Patent [19]

Cho

[11] Patent Number: 5,768,050
[45] Date of Patent: Jun. 16, 1998

[54] HARD DISK DRIVE USING A ROTARY ACTUATOR AND HAVING AN ISOLATED VOICE COIL MOTOR

[75] Inventor: Jin-Won Cho, Seoul, Rep. of Korea

[73] Assignee: SamSung Electronics Co., Ltd., Suwon, Rep. of Korea

[21] Appl. No.: 358,612

[22] Filed: Dec. 14, 1994

[30] Foreign Application Priority Data

Dec. 18, 1993 [KR] Rep. of Korea ............... 1993-28428

[51] Int. Cl.⁶ .................. G11B 33/14; G11B 5/55
[52] U.S. Cl. ...................... 360/97.02; 360/106
[58] Field of Search ................... 360/97.02, 106

[56] References Cited

U.S. PATENT DOCUMENTS

| | | |
|---|---|---|
| 4,062,049 | 12/1977 | Dirks . |
| 4,439,699 | 3/1984 | Brende . |
| 4,658,313 | 4/1987 | Takahashi . |
| 4,725,904 | 2/1988 | Dalziel ..................... 360/106 |
| 4,772,974 | 9/1988 | Moon . |
| 4,941,062 | 7/1990 | Yoshioka . |
| 5,008,573 | 4/1991 | Beppu . |
| 5,041,934 | 8/1991 | Stefansky . |
| 5,109,310 | 4/1992 | Ohkjita . |
| 5,195,002 | 3/1993 | Sakurai . |
| 5,247,410 | 9/1993 | Ebihara ..................... 360/97.01 |
| 5,305,169 | 4/1994 | Anderson . |
| 5,315,466 | 5/1994 | Nishimoto . |

*Primary Examiner*—A. J. Heinz
*Attorney, Agent, or Firm*—Robert E. Bushnell, Esq.

[57] ABSTRACT

The present invention relates to a hard disk drive used as an auxiliary memory of a computer, and more particularly to an a hard disk drive for positioning a voice coil motor, which drives an actuator at which a head of the hard disk drive is installed, at an exterior chamber thereof. A hard disk drive including an actuator being installed in a pivot having an E-shaped block for assembling a head gimbals with a head which reads/writes data from recording media and a voice coil motor for driving the E-shaped block comprises a housing constituted as three end portions, centering around the pivot, a pivot housing installed in the housing to rotate the pivot, the E-shaped block positioned in an inner portion of the housing and assembled in one portion of the pivot to be rotatable, and the voice coil motor positioned in an outer portion of the housing and assembled in the other portion of the pivot, the E-shaped block being rotatable by the voice coil motor.

18 Claims, 1 Drawing Sheet

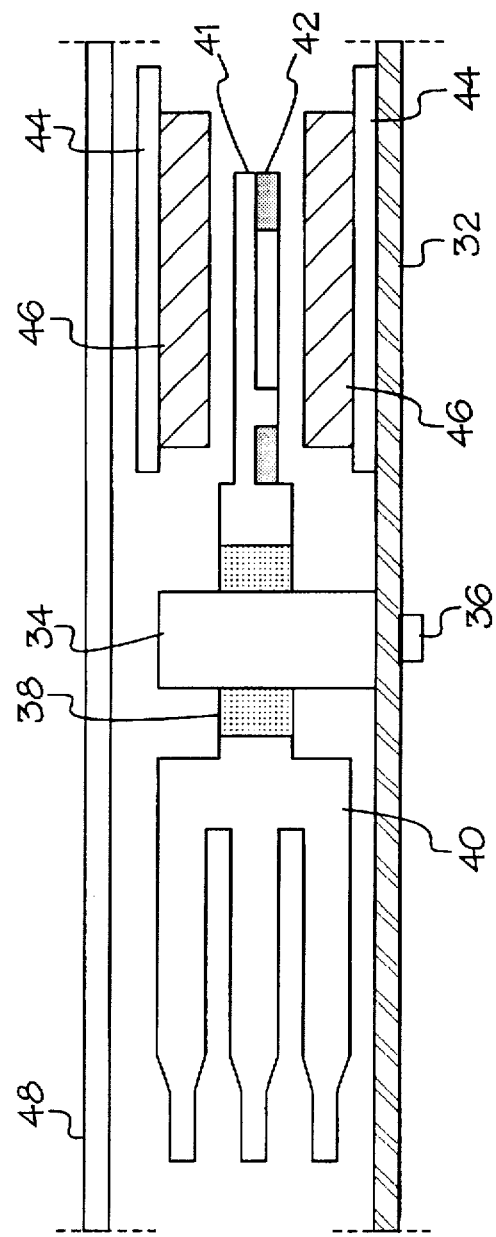
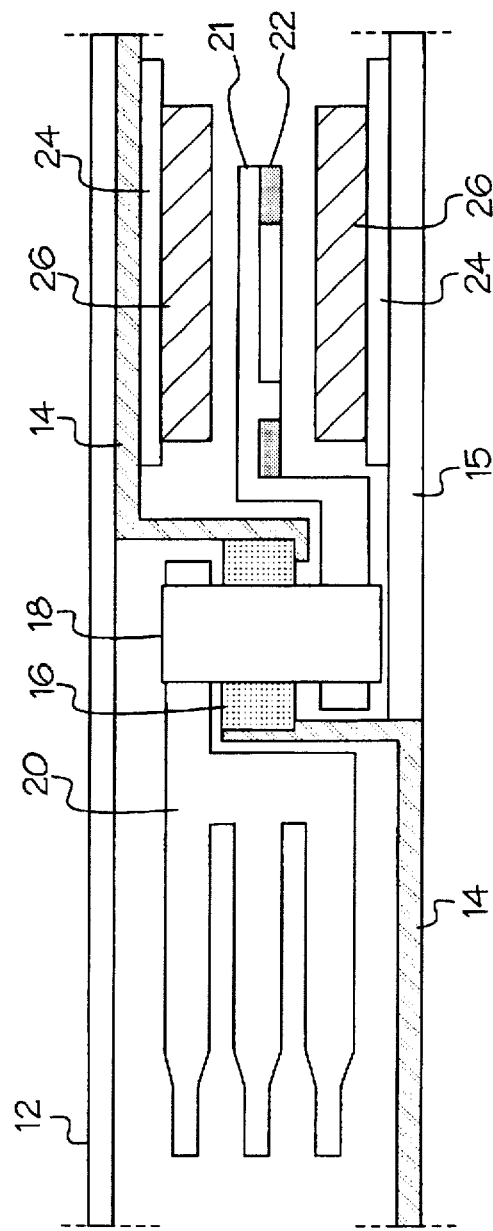

HARD DISK DRIVE USING A ROTARY ACTUATOR AND HAVING AN ISOLATED VOICE COIL MOTOR

CROSS-REFERENCE TO RELATED APPLICATIONS

This application makes reference to, incorporates the same herein, and claims all benefits incurring under 35 U.S.C. §119 from an application for *A Hard Disk Drive Using A Rotary Actuator And Having An Isolated Voice Coil Motor* filed in the Korean Industrial Property Office on 18 Dec. 1994, and assigned Ser. No. 28,428/1993.

BACKGROUND OF THE INVENTION

The present invention relates to a hard disk drive used as an auxiliary memory of a computer, and more particularly to a hard disk drive using a rotary actuator for positioning a voice coil motor with the voice coil motor housed in a section of the hard disk drive isolated from a section of the hard disk drive housing the hard disk.

Typically, a hard disk drive (HDD) as a computer auxiliary memory includes a disk rotated at a high speed by a spindle motor and an actuator with a magnetic head for writing and reading data recorded in a track of the disk. The actuator is installed to turn on its pivot. A magnetic head is installed at one end portion of the actuator, and a bobbin and a coil constituting a voice coil motor are installed at the other portion thereof. If the power, i.e., voice coil current, is applied to the coil, the actuator rotates around its pivot. Then, the magnetic head moves along and adjacent to the surface of the disk, thereby enabling writing or reading of data on the track of the disk.

Under such a state, when the disk is rotated at a high speed by a spindle motor, the magnetic head is separated by a minute interval from the surface of the disk and moves while maintaining the minute interval.

In an actuator of a conventional hard disk driver, because the bobbin and the coil which drive the actuator are disposed in the interior portion of the hard disk driver, if a defect occurs in the bobbin and the coil, the cover of the hard disk drive has to be opened in order to correct the defect. At this time, however, in order to minimize the risk of contamination and introduction of foreign matter into the hard disk drive, the cover has to be opened only in a clean room since the interior portion of the hard disk drive body requires a high degree of cleanliness of both its environment and ambient air.

U.S. Pat. No. 4,700,246 by Luoma et al. entitled *DISK DRIVE WITH ISOLATED VOICE COIL MOTOR MAGNET*, discloses a disk storage device having a sealed enclosure in which the heads and disks are located. The voice coil motor is positioned exterior to the sealed enclosure. Instead of a pivoting actuator, however, Luoma et al.'s device uses a linear or horizontally movable actuator such as that disclosed in U.S. Pat. No. 4,439,699 by Brende et al. entitled *LINEAR MOVING COIL ACTUATOR*.

SUMMARY OF THE INVENTION

It is therefore an object of the present invention to provide a hard disk drive.

It is another object to provide a hard disk drive that prevents a magnetic head or a disk as recording media thereof from being adversely affected by gas generated from an adhesive such as a bonding agent used when a coil is attached to a bobbin.

It is another object to provide a hard disk drive which can observe a bobbin and a coil at an exterior portion thereof in an environment of contaminated air, when a defect occurs in the bobbin and the coil, by providing access to the bobbin and coil without exposing the hard disk to the contaminated air when constructing or repairing a voice coil motor.

It is still object of the present invention to provide a hard disk drive which can be repaired or re-worked outside of a clean room.

According to an aspect of the present invention, there is provided a hard disk drive in which a bobbin, a coil, yokes and magnets as components of a voice coil motor are installed in an exterior portion of the hard disk driver.

BRIEF DESCRIPTION OF THE DRAWINGS

These and other objects, features, and advantages of the present invention are better understood by reading the following detailed description of the invention, taken in conjunction with the accompanying drawings. In the drawings, it should be noted that like elements represent like symbols or reference numerals, wherein:

FIG. 1 is an abstract cross-sectional view illustrating main component parts of a conventional hard disk drive; and FIG. 2 is a cross-sectional view illustrating main component parts of a hard disk constructed drive according to principles of the present invention.

DETAILED DESCRIPTION OF THE PREFERRED EMBODIMENT

Turning now to the drawings, in as shown in FIG. 1, a pivot 34 for assembling the actuator is fixed by a screw 36 on the bottom surface of a base 32 defining the boundary between the interior and exterior portions of the hard disk driver. A ring-shaped pivot housing 38 is inserted onto the pivot 34 so that the pivot housing 38 can be rotated. The actuator is installed in the pivot housing 38. An E-shaped block 40 is located at one portion of the actuator and a bobbin 41 and a coil 42 are installed for driving the actuator itself at the other portion thereof. The coil 42 is attached to the bobbin 41 by an adhesive such as a bond. Yokes 44 with a magnet 46 are respectively installed on the upper and bottom portions of a position separated from the bobbin 41 and the coil 42. A cover 48 is fixed to the base 32. In the conventional hard disk drive constructed as represented by FIG. 1, if the power is applied to the coil 42 according to an electric signal, the actuator turns on its pivot 34 by electromagnetic force induced to the coil 42. As previously discussed, in such a conventional hard disk driver the bobbin and the coil which drive the actuator are disposed in the interior portion of the hard disk driver.

In a hard disk drive constructed according to the present invention, as shown in FIG. 2, a housing 14, defining the boundary between the interior and exterior portions, or chambers, of the hard disk drive, is comprised of three portions, i.e., a front portion, middle portion and rear portion, the middle portion having a pivot housing 16 installed therein for insertion of a pivot 18, wherein the pivot 18 extends from the interior chamber of the hard disk drive to the exterior chamber of the hard disk drive through the pivot housing 16. A recording medium (not shown) is installed in the interior chamber of the hard disk drive.

The pivot housing 16 is assembled to rotate the pivot 18. An E-shaped block 20, also known as an actuator arm, for installing head gimbals (not shown), is attached to a first portion of the pivot 18, the first portion being positioned at the interior chamber of the hard disk drive. A bobbin 21 and a coil 22 constituting a voice coil motor are attached to a second portion of the pivot 18, the second portion being positioned at the exterior chamber of the hard disk drive. Magnetic heads (not shown) are installed on the head gimbals.

Yokes 24 with magnets 26, further constituting the voice coil motor, are respectively disposed between the front portion of housing 14 and a base 15, wherein the magnets 26 are separated by a predetermined distance from the bobbin 21 and the coil 22.

A cover 12 is fixed to the front end portion of the housing 14 in order to close the interior chamber of the hard disk drive. A base 15, which is easily opened and closed, is positioned to abut the rear portion of the housing 14 adjacent to the second portion of pivot 18. The front portion of housing 14 in combination with the base 15 enclose the components of the voice coil motor for protecting the bobbin 21, coil 22, yokes 24 and magnets 26. The components of the voice coil motor are easily accessible when the base is opened. Further, a first one of the yokes may be attached to the front portion of the housing 14, and a second one of the yokes may be attached to the base 15. Accordingly, when the base is opened the second one of the yokes and its corresponding magnet are moved away from the bobbin 21 and coil 22 to give easy access to the bobbin 21 and coil 22.

In an actuator of the hard disk drive constructed according to the present invention, as mentioned above, if the power is applied to the coil 22 in accordance with an electric signal, the pivot 18 of the actuator rotates at the pivot housing 16 by electromagnetic force induced to the coil 22. Thereby, the E-shaped block 20, attached at the first portion of pivot 18, rotates or pivots to move the magnetic heads along a predetermined path adjacent to the magnetic recording medium. The magnetic heads are separated by a minute interval from the surface of the disk, wherein the minute interval between each head and the recording medium is maintained by an air current generated when the recording medium rotates.

As can be appreciated from the foregoing description, there is provided a hard disk drive constructed according to the present invention which prevents a magnetic head or a disk as recording media thereof from being contaminated, e.g., by gas generated from, for example, a bonding adhesive used when a coil is attached to a bobbin, since a bobbin, a coil, yokes and magnets as components of a voice coil motor are installed in an exterior chamber of the hard disk drive. Further, there is provided a hard disk drive which positions a bobbin, a coil, yokes and magnets in an exterior chamber thereof, and when a defect, for example, vibration arises in the components comprising the voice coil motor those components can be re-worked without exposing the disks and heads in the interior chamber, thus obviating a need to enter a clean room.

What is claimed is:

1. A hard disk drive comprising:
a pivot having an E-shaped block for positioning head gimbels with heads to read and write data on a recording media;
a voice coil motor for driving said E-shaped block:
a housing having a front portion, a middle portion and a rear portion, said housing separating said hard disk drive into an interior chamber and an exterior chamber;
a pivot housing installed in said middle portion of said housing for allowing said pivot to rotate;
said E-shaped block being attached to a first portion of said pivot to be rotatable above said rear portion of said housing and in said interior chamber of said hard disk drive; and said voice coil motor having first means attached to a second portion of said pivot in the exterior chamber of said hard disk drive, said voice coil motor being positioned below said front portion of said housing, said first means receiving an electrical signal for rotating said E-shaped block.

2. The hard disk drive as defined in claim 1, further comprising:
said first means of said voice coil motor comprising:
a bobbin connected with the second portion of said pivot, and
a coil attached to said bobbin; and
second means of said voice coil motor comprising:
a first yoke and a first magnet disposed above and separated by a predetermined distance from said bobbin, and
a second yoke and a second magnet disposed below and separated by a predetermined distance from said coil.

3. The hard disk drive as defined in claim 1, further comprising a base adjacent said rear portion of said housing, said base, in combination with said front portion of said housing, enclosing said voice coil motor within said exterior chamber of said hard disk drive, wherein said base is easily opened and closed to allow access to said voice coil motor.

4. The hard disk drive as defined in claim 3, further comprising a cover attached to said front portion of said housing, said cover, in combination with said rear portion of said housing, enclosing said E-shaped block within said interior chamber of said hard disk drive.

5. The hard disk drive as defined in claim 1, further comprising a cover attached to said front portion of said housing, said cover, in combination with said rear portion of said housing, enclosing said E-shaped block within said interior chamber of said hard disk drive.

6. The hard disk drive as defined in claim 5, further comprising a base adjacent said rear portion of said housing, said base, in combination with said front portion of said housing, enclosing said voice coil motor within said exterior chamber of said hard disk drive, wherein said base is easily opened and closed to allow access to said voice coil motor.

7. The hard disk drive of claim 1, further comprised of:
said voice coil motor comprising a pair of spaced-apart yokes positioned on opposite sides of said first means with a first one of said yokes connected to and removable with said base from said exterior chamber.

8. A hard disk drive having an actuator comprising a pivot having an actuator arm for attaching head gimbals with heads which read/write data from a recording media and a voice coil motor for driving said actuator arm, said hard disk drive comprising:
a housing having a front portion, a middle portion and a rear portion, said housing separating said hard disk drive into an interior chamber and an exterior chamber;
a pivot housing installed in said middle portion of said housing for allowing said pivot to rotate;
a cover attached to said front portion of said housing, said cover, in combination with said rear portion of said housing, enclosing said actuator arm within said interior chamber of said hard disk drive; and
a base adjacent said rear portion of said housing, said base, in combination with said front portion of said housing, enclosing said voice coil motor within said exterior chamber of said hard disk drive, wherein said base is easily opened and closed to allow access to said voice coil motor.

9. The hard disk drive as defined in claim 8, further comprising said voice coil motor having first means attached to a second portion of said pivot in the exterior chamber of said hard disk drive, said voice coil motor being positioned below said front portion of said housing, said first means receiving an electrical signal for rotating said actuator arm.

10. The hard disk drive as defined in claim 9, further comprising:

said first means of said voice coil motor comprising:

a bobbin connected with the second portion of said pivot, and a coil attached to said bobbin; and second means of said voice coil motor comprising:

a first yoke and a first magnet disposed above and separated by a predetermined distance from said bobbin, and a second yoke and a second magnet disposed below and separated by a predetermined distance from said coil.

11. The hard disk drive as defined in claim 8, further comprising said actuator arm being attached to a first portion of said pivot to be rotatable above said rear portion of said housing and in said interior chamber of said hard disk drive.

12. A hard disk drive having an actuator, comprising:

a pivot having an E-shaped block for positioning head gimbels with heads to read and write data on a recording media;

a voice coil motor for driving said E-shaped block;

a housing having a front portion, a middle portion and a rear portion, said housing separating said hard disk drive into an interior chamber and an exterior chamber;

said pivot extending from a first portion positioned within said inner chamber to a second portion positioned within said exterior chamber;

a pivot housing installed in said middle portion of said housing for allowing said pivot to rotate under influence of said voice coil motor;

said E-shaped block being attached to said first portion of said pivot to be rotatable above said rear portion of said housing and in said interior chamber of said hard disk drive;

a cover connected to said front portion of said housing, said cover extending across said first portion and said rear portion and, with said housing, to enclose said interior chamber with said first portion and said E-shaped block positioned between said rear portion and said cover;

said voice coil motor having first means attached to said second portion of said pivot in the exterior chamber of said hard disk drive, said voice coil motor being positioned below said front portion of said housing, said fist means receiving an electrical signal for rotating said E-shaped block; and a base abutting said rear portion of said housing adjacent to said second portion of said pivot, said front portion of said housing and said base enclosing said second portion and said voice coil motor within said exterior chamber between said front portion of said housing and said base.

13. The hard disk drive of claim 12, further comprised of:

said voice coil motor comprising a pair of spaced-apart yokes positioned on opposite sides of said first means with a first one of said yokes connected to said base, said base and said first one of said yokes being removable from said exterior chamber to allow access to said voice coil motor.

14. The hard disk drive of claim 13, further comprised of:

said housing, said cover, and said base enclosing said voice coil motor, said pivot, and said E-shaped block within said hard disk drive while said pivot housing in combination with said housing isolates said interior chamber from gases emanating from said voice coil motor.

15. The hard disk drive of claim 13, further comprised of:

said housing in combination with said pivot housing isolating said interior chamber from exterior chamber.

16. The hard disk drive of claim 12, further comprised of:

said housing in combination with said pivot housing isolating said interior chamber from exterior chamber.

17. The hard disk drive of claim 12, further comprised of:

said housing, said cover, and said base enclosing said voice coil motor, said pivot, and said E-shaped block within said hard disk drive while said pivot housing in combination with said housing isolates said interior chamber from gases emanating from said voice coil motor.

18. The hard disk drive of claim 1, further comprised of:

said housing in combination with said pivot housing isolating said interior chamber from exterior chamber.

* * * * *